(12) United States Patent
Kamijima et al.

(10) Patent No.: US 6,525,901 B1
(45) Date of Patent: Feb. 25, 2003

(54) THIN FILM MAGNETIC HEAD AND METHOD OF MANUFACTURING THE SAME

(75) Inventors: Akifumi Kamijima, Tokyo (JP); Junichi Hokushin, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/534,527

(22) Filed: Mar. 27, 2000

(30) Foreign Application Priority Data

Apr. 2, 1999 (JP) .............................................. 11-097070

(51) Int. Cl.⁷ .................................................. G11B 5/31
(52) U.S. Cl. ........................ 360/123; 360/126; 360/317
(58) Field of Search ................................ 360/126, 317, 360/320, 321, 318, 123

(56) References Cited

U.S. PATENT DOCUMENTS

| | | | | |
|---|---|---|---|---|
| 5,560,097 A | * | 10/1996 | Bajhorek et al. | 29/603.12 |
| 5,703,740 A | * | 12/1997 | Cohen et al. | 360/126 |
| 5,717,308 A | * | 2/1998 | Nishitani et al. | 396/279 |
| 5,909,340 A | * | 6/1999 | Lairson et al. | 360/104 |
| 6,104,576 A | * | 8/2000 | Santini | 360/126 |
| 6,151,194 A | * | 11/2000 | Steinbrecher | 360/126 |
| 6,233,116 B1 | * | 5/2001 | Chen et al. | 360/126 |
| 6,246,541 B1 | * | 6/2001 | Furuichi et al. | 360/123 |
| 6,307,720 B1 | * | 10/2001 | Hayakawa | 360/126 |
| 6,317,288 B1 | * | 11/2001 | Sasaki | 360/126 |
| 6,317,290 B1 | * | 11/2001 | Wang et al. | 360/126 |
| 6,329,211 B1 | * | 12/2001 | Terunuma et al. | 438/3 |
| 6,333,830 B2 | * | 12/2001 | Rose et al. | 360/123 |

FOREIGN PATENT DOCUMENTS

JP      A-9-180127      7/1997

* cited by examiner

Primary Examiner—Brian E. Miller
Assistant Examiner—Dzung C Nguyen
(74) Attorney, Agent, or Firm—Oliff & Berridge PLC

(57) ABSTRACT

An insulating film, provided above a first yoke portion, supports a thin film coil and has an inclined portion in an air bearing surface side. A second pole portion of a second magnetic film is opposed to a first pole portion via gap film. A second yoke portion, provided on the insulating film, continues to the second pole portion and its rear portion is joined with the first yoke portion. A top thin film coil 27 has a coil winding body portion with small thickness H1 nearest the air bearing surface and a coil winding body portion with larger thickness H3 than the thickness H3.

8 Claims, 6 Drawing Sheets

THIN FILM MAGNETIC HEAD AND METHOD OF MANUFACTURING THE SAME

BACKGROUND OF THE INVENTION

1) Field of the Invention

This invention relates to a thin film magnetic head including a slider and a thin film magnetic head element and a method for manufacturing the same.

2) Related Art Statement

In manufacturing of a thin film magnetic head, normally, a first magnetic film (bottom magnetic film), a gap film and a thin film coil separated and supported by an insulating film are formed, and thereafter, a second magnetic film to constitute a top magnetic film is formed. The thin film coil is formed in a constant thickness so as to wind around the backward joining portion (back gap) to join the first magnetic film and the second magnetic film.

In the formation of the second magnetic film, a plate underfilm for the second magnetic film is formed entirely on a wafer including the insulating film by sputtering, etc. Then, a photoresist is applied on the plate underfilm and processed by a photolithography process to form a resistframe having the desired pattern for the second magnetic film. Subsequently, the second magnetic film is formed by electroplating, etc., in the area enclosed by the resistframe.

One of the problems in the manufacturing process of the second magnetic head is that in the photolithography process to form the resistframe, a part of an exposing light is reflected at the insulating film, reaches the area beyond a photomask, and exposes the part of the photoresist except to be defined by the photomask, resulting in the degradation of the pattern precision in the resistframe and the second magnetic film.

The degradation of the pattern precision appears at its pole portion conspicuously. In the pole portion, the second magnetic film is opposed to the first magnetic film via the gap film. The insulating film is located backward from the pole portion, and rises up at a given angle on the gap film with inclination. The start point of the rising up corresponds to a Throat Height zero point and the angle of the rising up corresponds to an Apex Angle.

The part of the second magnetic film up to the Throat Height zero point constitutes the pole portion parallel to the gap film and the first magnetic film, and the remainder is inclined at the Apex Angle toward the upper surface of the insulating film from the Throat Height zero point. Therefore, in forming the resistframe for the second magnetic film by the photolithography, the part of the photoresist stuck on the inclined portion of the insulating film which is inclined at the Apex Angle toward the upper surface of the insulating film from the Throat Height zero point has to be exposed. In this case, since the plate underfilm is stuck on the inclined portion, the exposing light is reflected at the plate underfilm, and then, the part of the exposing light leaves for the pole portion. Accordingly, the exposed pattern of the pole portion differs from the exposing pattern of the photomask, resulting in the pattern deformation of the resistframe.

The pattern deformation is large obstacle for realizing a high density recording through narrowing a recording track width up to 1.0 μm and below.

Kokai publication No. 9-180127 (JP A 9-180127) discloses the technique that before applying a photoresist to constitute a mask for a top magnetic film, an antireflection film is formed, and the photoresist is applied on the antireflection film, exposed and developed, to form a resistframe as a mask for a second magnetic film. After forming the resist frame, the part of the antireflection film exposing to the bottom surface of the opening in the resist frame is removed by an ashing means, etc. and the second magnetic film is formed by plating, etc.

In the above conventional technique, the antireflection film exists entirely within the inner pattern enclosed by the resistframe. The inner pattern of the resistframe has a pole portion area corresponding to the pole portion of the top magnetic film and a second yoke portion corresponding to a yoke portion. The part of the antireflection film in the pole portion area and the second yoke portion area has to be removed.

However, the resistframe has extremely different opening areas for the pole portion area and the second yoke portion. Furthermore, for realizing a high density recording, the opening area of the pole portion is required to be narrowed up to a minute size of 1 μm and below. Consequently, in removing the part of the antireflection film stuck on the inner pattern enclosed by the resistframe, the second yoke portion area has a different etching rate from that of the pole portion area, and the pole portion area requires longer etching time than the second yoke portion. As a result, during the removing of the antireflection film, the resistframe is over-etched to have its too enlarged frame distance. That is, the antireflection which is formed to narrow its pole width enlarges the resistframe distance because it requires the above removing process, which is obstacle for narrowing of the pole width.

SUMMARY OF THE INVENTION

It is an object of the present invention to provide a thin film magnetic head having a narrowed recording track width by forming a top magnetic film, particularly its pole portion on an insulating film in a precise pattern without the increase of the electric resistance of a thin film coil entirely.

It is another object of the present invention to provide a method for manufacturing the above thin film magnetic head effectively and precisely.

This invention relates to a thin film magnetic head comprising a slider having an air bearing surface opposing to a magnetic recording medium and an inductive type thin film magnetic head element, provided on the end face of the slider in air outflow side, including a first magnetic film, a second magnetic film, a gap film, and thin film coils, the first magnetic film having a first pole portion of which forefront is exposed to the air bearing surface and a first yoke portion which extends backward from the air bearing surface, the second magnetic film having a second pole portion which is opposed to the first pole portion of the first magnetic film and of which forefront is exposed to the air bearing surface and a second yoke portion which extends backward from the air bearing surface and magnetically joined with the first yoke portion of the first magnetic film at a back gap portion, the gap film being provided at least between the first pole portion of the first magnetic film and the second pole portion of the second magnetic film, the thin film coils winding around the back gap portion so as to pass through the magnetic circuit enclosed by the first and second magnetic films and being supported by insulating films, wherein the insulating films to support the thin film coils is provided in between the first and the second yoke portions, and the top thin film coil of the thin film coils has a coil winding body portion with a smaller thickness nearest the air bearing surface than that of a coil winding body portion at the middle between the first and second pole portions and the back gap portion.

In the thin film magnetic head, since the top thin film coil has a coil winding body portion with smaller thickness nearest the air bearing surface than the middle coil winding body portion between the pole portion and the backward joining portion to constitute the back gap portion, the top insulating film may have the thickness distribution that it is thinnest nearest the air bearing surface and thicker at the middle between the pole portion and the backward joining portion. Therefore, the top insulating film to cover the second magnetic head can have a gentle rising inclination angle, and then, the exposed pattern of the photoresist to define the pattern of the resistframe corresponding to the second pole portion can be almost determined by the exposing pattern of the photomask. As a result, the pattern of the resistframe corresponding to the second pole portion can be formed precisely, and thus, the second pole portion can be formed so as to have a precise pattern. Moreover, since the pattern of the resistframe corresponding to the second pole portion can be formed in a precise pattern, the thin film magnetic head having the narrowed recording track width can be manufactured.

Moreover, it is not required that an antireflection film is formed on the insulating film to support the thin film coil. Therefore, the pattern degradation of the resistframe due to the difference in the etching rates between the second yoke portion area and the second pole portion area within the resistframe and the height degradation of the resistframe can be excluded. As a result, the second pole portion and the second yoke portion can be formed in a precise pattern, respectively.

Furthermore, since the thin film coil is thicker at the middle between the pole portion and the backward joining portion, it can have relatively small electric resistance, so that the whole efficiency of the thin film magnetic head can be prevented from being degraded.

In the thin film magnetic head of the present invention, it is preferable that the top thin film coil has a middle coil winding body portion with its maximum thickness between at the middle of the coil winding portion and forward and backward coil winding body portions with gradually declined thickness forward and backward from the middle coil winding body portion. Moreover, the top thin film coil has a smaller lateral cross section width in the thinner coil winding portion than in the thicker coil winding portion. In this invention, the insulating film to support the thin film coil has preferably an inclination angle β of 20 degrees or below.

This invention also relates to a frame plating method for forming a thin film coil of an inductive type thin film magnetic head comprising the steps of:

forming a plate underfilm on a surface on which a thin film is formed, forming a resistframe with openings having different opening widths on the plate underfilm, and growing coil plated films with different thicknesses corresponding to the different opening widths on the plate underfilm.

According to this frame plating method, the coil plated film can be formed thinner at the small opening area (frame distance) of the resistframe and thicker at the large frame distance of the resistframe. Therefore, the thin film coil in the thin film magnetic head of the present invention can be formed easily by selecting the frame distance of the resistframe appropriately. In this case, the above plating method is a direct-current plating method.

This invention further relates to a method for manufacturing a thin film magnetic head comprising a slider having an air bearing surface opposing to a magnetic recording medium and an inductive type thin film magnetic head element, provided on the end face of the slider in air outflow side, including a first magnetic film, a second magnetic film, a gap film, and thin film coils, the first magnetic film having a first pole portion of which forefront is exposed to the air bearing surface and a first yoke portion which extends backward from the air bearing surface, the second magnetic film having a second pole portion which is opposed to the first pole portion of the first magnetic film and of which forefront is exposed to the air bearing surface and a second yoke portion which extends backward from the air bearing surface and magnetically joined with the first yoke portion of the first magnetic film at a back gap portion, the gap film being provided at least between the first pole portion of the first magnetic film and the second pole portion of the second magnetic film, the thin film coils winding around the back gap portion so as to pass through the magnetic circuit enclosed by the first and second magnetic films and being supported by insulating films, comprising the steps of:

forming a plate underfilm on a surface on which the top thin film coil of the thin film coils is formed, forming a resistframe with openings having different opening widths corresponding to the thickness of each coil winding body portion to constitute the top thin film coil, growing plated films to constitute the coil winding body on the plate underfilm via the openings of the resistframe and thereby, obtaining the coil winding body which has smaller thickness nearest the air bearing surface than the middle thereof, removing the resistframe, removing the parts of the plate underfilm uncovered with the coil winding body and thereby, forming the top thin film coil, and forming the second magnetic film by photolithography after forming an insulating film to support the top thin film coil.

According to the above manufacturing method of a thin film magnetic head, the coil winding body to constitute the thin film coil can be formed by the direct-current plating method. Moreover, it is preferable that the resistframe has the opening with its maximum lateral cross section width at the middle between the pole portion and the back gap portion and the openings with their gradually declined lateral cross section width forward and backward from the middle.

The manufacturing method of the present invention may be applied for various types of thin film magnetic head. For example, a self-alignment type (hereinafter, called as a "SA type") thin film magnetic head as well as a normal thin film magnetic head can be formed by the manufacturing method. The insulating film includes a first insulating film and a second insulating film. The first insulating film supports the thin film coil. The second insulating film is provided at the base portion of the first insulating film in the air bearing surface side, and determines its Throat Height zero point.

BRIEF DESCRIPTION OF THE DRAWINGS

For a better understanding of this invention, reference is made to the attached drawings, wherein.

DETAILED DESCRIPTION OF PREFERRED EMBODIMENTS

Figure 1:
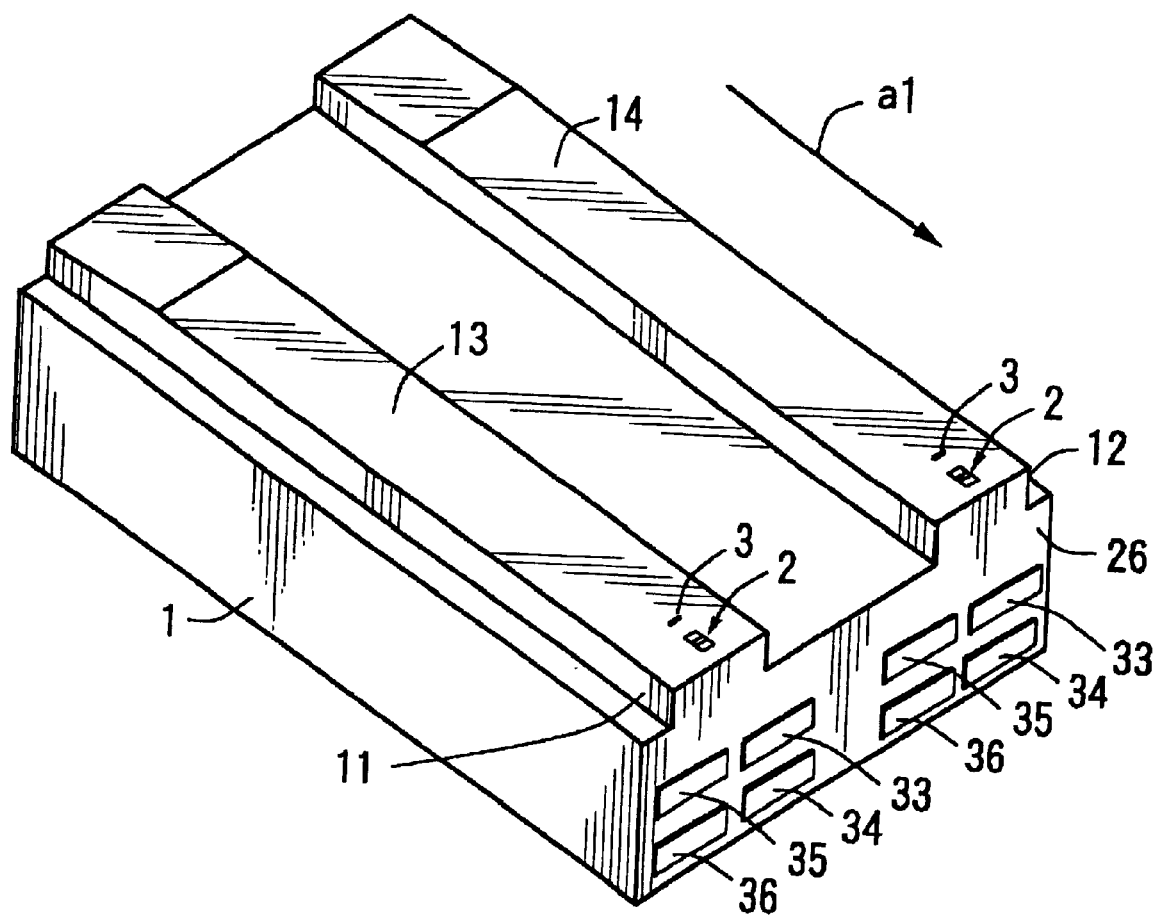
FIGS. 1 and 2 are a perspective view and a cross sectional view of an example in the thin film magnetic head of the present invention, respectively.
Figure 2:
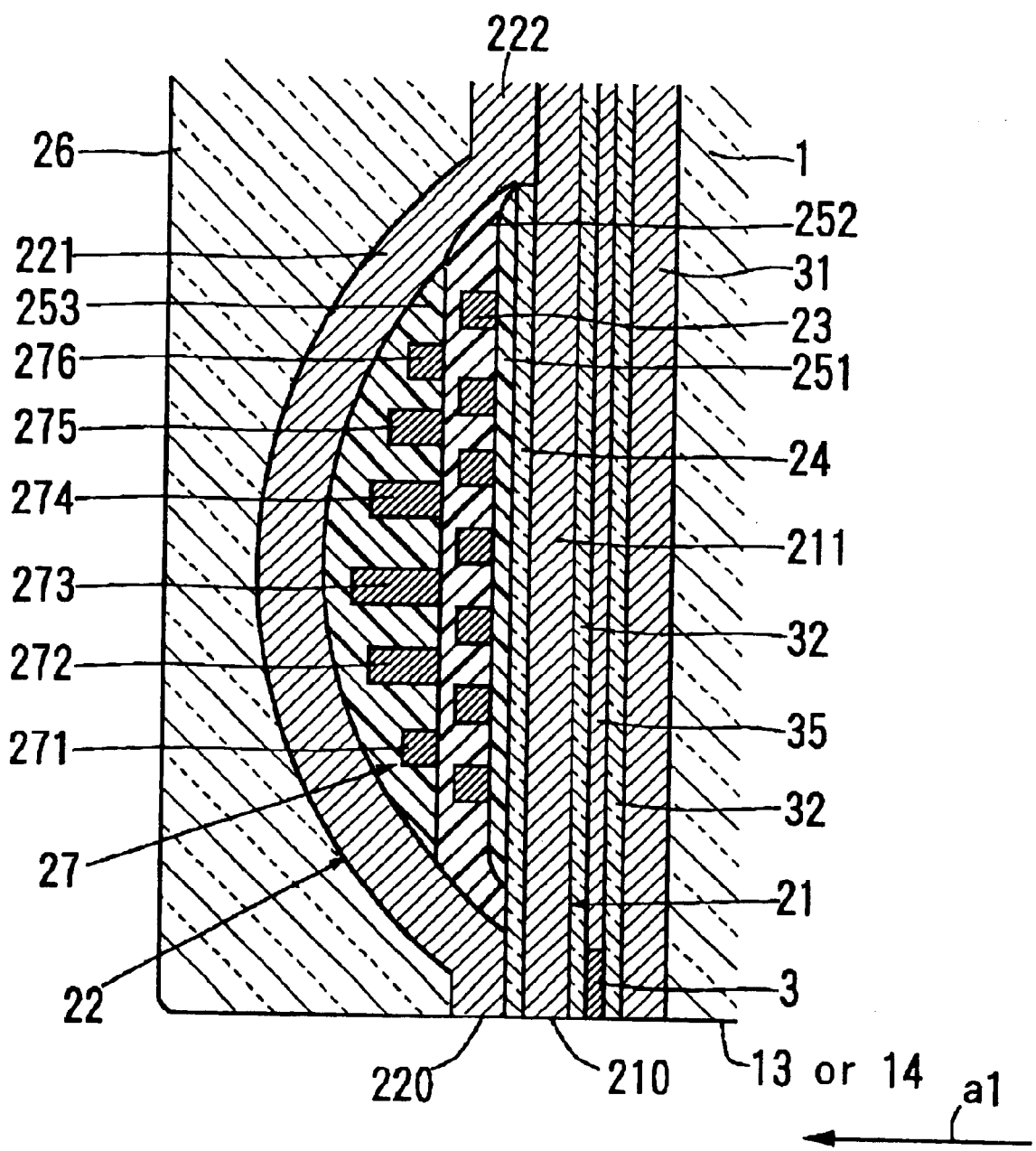

FIGS. 1 and 2 are a perspective view and a cross sectional view of an example in the thin film magnetic head of the present invention, respectively. In these figures, each part is illustrated with exaggeration, and is different from its real size. The illustrated thin film magnetic head has a slider 1 and two inductive type thin film magnetic conversion element 2. The slider 1 has rail parts 11 and 12 on its medium opposing surface. The surfaces of the rail parts 11 and 12 are employed as air bearing surfaces (hereinafter, called as "ABS"s) 13 and 14. The slider 1 does not always have the two rail parts 11 and 12, and may have one to three rail parts. Moreover, the slider may a flat surface having no rail part. For improving its floating characteristic, the slider may have a medium opposing surface with a variety of geometrical shape, and thereby, the ABSs may have various shapes. The present invention can be applied for any kind of thin film magnetic head with the above slider. The slider 1 is made of a ceramic material such as AlTiC.

As shown in FIG. 2, the thin film magnetic conversion element 2, provided on the slider 1, includes a first magnetic film 21, a gap film 24, a second magnetic film 22, thin film coils 23, 271 to 276, insulating films 251 to 253 and a protection layer 26. The first magnetic film 21 has a first pole portion 210 and a first yoke portion 211. The first yoke portion 211 continue to the first pole portion 210, and is extended backward from the first pole portion 210 on the basis of the ABSs 13 and 14.

In this example, the thin film magnetic conversion element 2 has two thin film coils 23 and 27. Each of thin film coils has a continuous spiral pattern. The first layer thin film coil 23 is supported by the insulating film 251 and covered with the insulating film 252. The second layer thin film coil 27 is provided on the insulating film 252 stacked on the insulating film 251, and constitutes a top thin film coil. The thin film coil 27 is covered with the insulating film 253. Although in this example, the thin film magnetic conversion element has the two layered thin film coils 23 and 27, the layer number and the winding number of the thin film coil are not restricted. The gap film 24 is provided at least on the first pole portion 210.

The insulating films 251 to 253 are provided above the first yoke portion 211, and have rising inclination portion on the gap film 24 in the ABSs 13, 14 side. The rising inclination portion generally has an arc shaped surface corresponding to the layer number of the insulating films 251 to 253.

The second magnetic film 22 includes a second pole portion 220 and a second yoke portion 221. The second pole portion 220 is opposed to the first pole portion 210 via the gap film 24. The second yoke portion 221 is provided on the insulating film 253, continuing to the second pole portion 220, and magnetically joined with the first yoke portion 211 at the back gap portion backward from the second pole portion 220.

The first magnetic film 21, the gap film 24, the second magnetic film 22, the thin film coils 23, 27, the insulating films 251 to 253 and the protection film 26 may be made of materials well known by an ordinary person skilled in the art and have thicknesses and patterns known by them as well. Moreover, they may be produced by normal means. The favorably concrete examples are exemplified as follows:

First of all, the first magnetic film 21 is formed, of a soft magnetic material such as NiFe, CoFe, CoFeNi, in a thickness of 0.5–4 $\mu$m. As the forming method, a plating method and a sputtering method etc. may be used.

The second magnetic film 22 is formed, of a soft magnetic material such as NiFe, CoFe, CoFeNi, in a thickness of 3–5 $\mu$m. As the forming method, a frame plating method, etc. can be used.

The thin film coils 23, 27 are formed of a conductive material such as Cu. The thickness of the thin film coil 23 is preferably 2–5 $\mu$m. The thin film coils 23, 27 may be formed by a frame plating method, etc.

The gap film 24 may be made of a non-magnetic insulating material such as $Al_2O_3$, $SiO_2$ or a non-magnetic metallic material. In making the film of the non-magnetic insulating material such as $Al_2O_3$, $SiO_2$, a sputtering method etc. may be used. In making the film of the non-magnetic metallic material, a plating method or a sputtering method can be used. The thickness of the gap film is preferably 0.01–0.5 $\mu$m.

The insulating films 251 to 253 are preferably formed through the hardening of a photoresist material. The layer number and the thickness of the whole insulating film depends on the layer number of the thin film coil and the coil-supporting structure. Generally, each of the insulating films has a thickness of about 3–20 $\mu$m.

The protection film 26 may be made of an insulating material such as $Al_2O_3$, $SiO_2$. Its thickness is preferably about 5–50 $\mu$m. The protection film 26 can be formed by a sputtering method, etc.

The thin film coils 23 and 27 constitute a thin film magnetic circuit with the first magnetic film 21, the second magnetic film 22 and the gap film 24. The thin film coils 23, 27 are supported by the insulating films 251 to 253, and winds spirally around a backward joining portion 222. The thin film coils 23 and 27 are connected each other so as to have a continuous spiral pattern, and both ends of the connected thin film coil are conductively connected to pull-out electrodes 33 and 34 (see, FIG. 1).

In the illustrated thin film magnetic head, since the slider 1 has ABSs 13 and 14 on its medium opposing surface and the thin film magnetic conversion element is provided on the slider 1, the thin film magnetic head can be employed as a floating thin film magnetic head which is used combined with a magnetic recording medium such as a magnetic disk.

Since the rear portion of the yoke part 221 of the second magnetic film 22 is magnetically joined with the first magnetic film 21, the magnetic field generated by flowing a writing current in the thin film coils 23, 27 can be effectively conducted to the first pole portion 210 and the second pole portion 220 via the second yoke portion 221.

The thin film magnetic head shown in FIGS. 1 and 2 is a composite type thin film magnetic head having the inductive type magnetic conversion element 2 for writing and a MR element 3 for reading. The thin film magnetic conversion elements 2 and 3 are provided on one end of either or both of the railing parts 11 and 12 in a medium moving direction a1. The medium moving direction a1 corresponds to an outflow direction of an air at the time when the medium moves at a high speed. On the end of the slider 1 in the medium moving direction a1 are provided the pull-out electrodes 33 and 34 connected to the thin film magnetic conversion element 2 and pull-out electrodes 35 and 36 connected to the thin film magnetic conversion element 3.

As the MR element, various film structures have been proposed and practically used. For example, a film structure having an anisotropic magneto-resistive (IMR) effective element made of peremalloy, a giant magnetoresistive (GMR) effective film or a ferromagnetic tunnel junction magnetoresistive (TMR) effective element is exemplified. In this invention, any kind of film structure may be employed. The MR element 3 is positioned, between a first shield film 31 and the first magnetic film 21 doubling as a second shield film, in an insulating film 32. The insulating film 32 is made of alumina, etc. The MR element 3 is connected to the pull-out electrodes 35 and 36 (see, FIG. 1) via a leading conductor 35 (see, FIG. 2).

Figure 3:
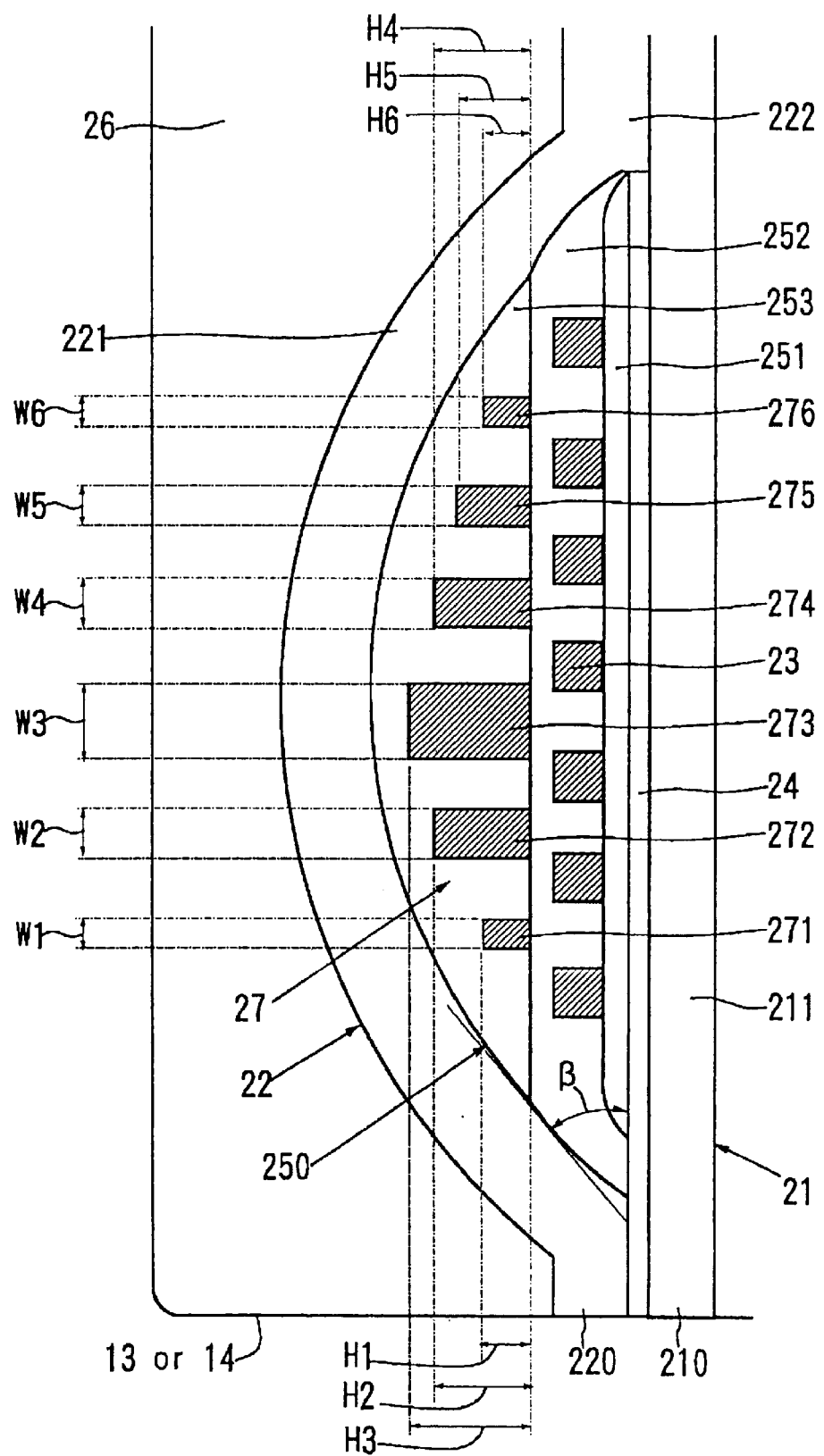
FIG. 3 is a diagrammatic cross sectional view of the thin film magnetic head depicted in FIGS. 1 and 2.

As shown in FIG. 3, according to the present invention, the top thin film coil 27 has its coil winding body portion with smaller thickness H1 nearest the ABSs 13 and 14 than the thickness H3 of the middle coil winding body portion 273, for example, in the above normal thin film magnetic head structure. Concretely, provided that the successively arranged coil winding body portions 271 to 276 have thickness H1 to H6, respectively, the coil winding body portions 271 to 273 satisfies the relation of H1<H2<H3. The coil winding portions 274 to 276 which are located backward from the coil winding portion 273 satisfies the relation of H6<H5<H4<H3.

In this example, the thinner coil winding body portion has a smaller lateral cross section area than the thicker coil winding body portion. Concretely, since the coil winding body portions 271 to 276 satisfies the relations of H1<H2<H3 and H6<H5<H4<H3, they have lateral cross section area W1 to W6, respectively which satisfies the relations of W1<W2<W3 and W6<W5<W4<W3.

Figure 4:
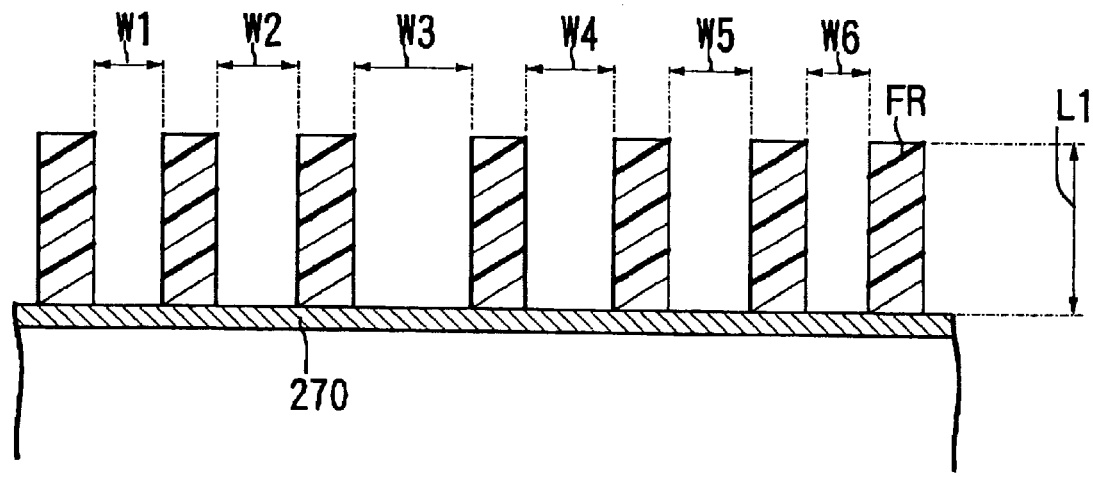
FIG. 4 is a cross sectional view showing one step in the manufacturing method of the thin film magnetic head.
Figure 5:
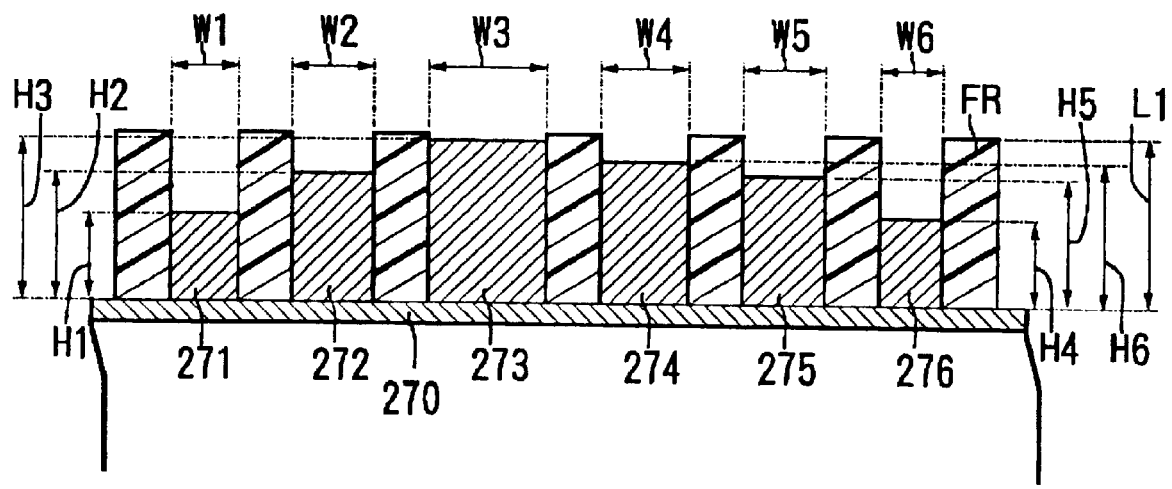
FIG. 5 is a cross sectional view showing the next step after the step shown in FIG. 4.

FIGS. 4 and 5 are cross sectional views to explain a frame plating method for forming the thin film coil 27 having the above coil winding body portions with different thicknesses. In the frame plating method, first of all, as shown in FIG. 4, a resistframe FR is formed on a plate underfilm 270 as a seed layer so as to have the same height L1 and different opening widths W1 to W6. Then, as shown in FIG. 5, coil plated films 271 to 276 with their thicknesses H1 to H6 can be grown by plating via the resistframe FR depending on the frame distance W1 to W6. That is, the coil plated film is formed thinner at the smaller frame distance of the resistframe and thicker at the larger frame distance thereof. The thin film coil 27 in the thin film magnetic head of the present invention can be formed easily by setting the frame distance W1 to W6 of the resistframe FR appropriately. In this case, a direct-current plating method is employed.

Figure 6:
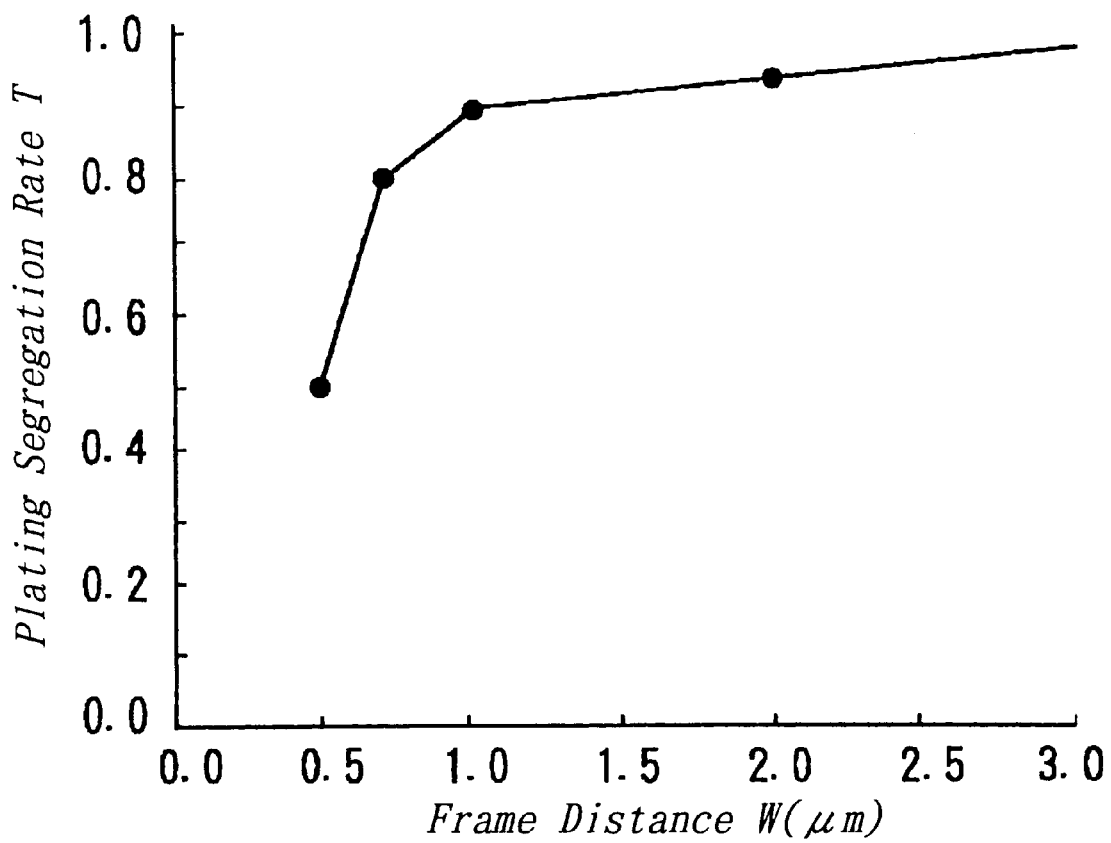
FIG. 6 is a graph showing the relation between a frame distance and a plating segregation rate of a plated film

FIG. 6 is a graph showing the relation between the frame distance W and the plating segregation rate T in the thickness direction of the plated film. The plating segregation rate is normalized on the condition that it has a segregation rate value of "1" at W=3 μm. As is apparent from the graph depicted in FIG. 6, the plating segregation rate T decreases as the frame distance W becomes small, and it increases as the frame distance W becomes large. The absolute value of the plating segregation rate T to the frame distance W varies depending on the composition of the plating bath, but the above relation does not change in the direct-current plating method. Therefore, the thickness of the plated film for the thin film coil 27 can be controlled through the adjustment of the frame distance W of the resistframe FR.

Thereafter, the resistframe FR is removed by a normal means using an organic solvent, etc., and the exposed parts of the plate underfilm 270 in between the coil plated films 271 to 276 are removed by dry-etching, etc.

The thin film magnetic head assembly having the above structure can provide various advantages. First of all, since in the top thin film coil 27, the coil winding body portion 271 nearest the ABSs 13 and 14 has the smaller thickness H1 than the thickness H3 of the middle coil winding body portion 273 between the pole portions 210, 220 and the backward joining portion 222, for example, the insulating film 253 to cover the top thin film coil 27 has its minimum thickness nearest the ABSs 13 and 14 and its maximum thickness at the middle between the pole portions 210, 220 and the backward joining portion 222. For example, as shown in FIGS. 2 and 3, the insulating film 253 can be formed so as to have the arc shaped thickness distribution. In this case, the insulating film 253 to cover the second magnetic film 22 can have an inclined portion 250 with a gentle inclination angle β. In view of repressing the reflection of the exposing light for the pole portion, the inclination angle β is preferably set to an angle of 20 degrees or below.

Figure 7:
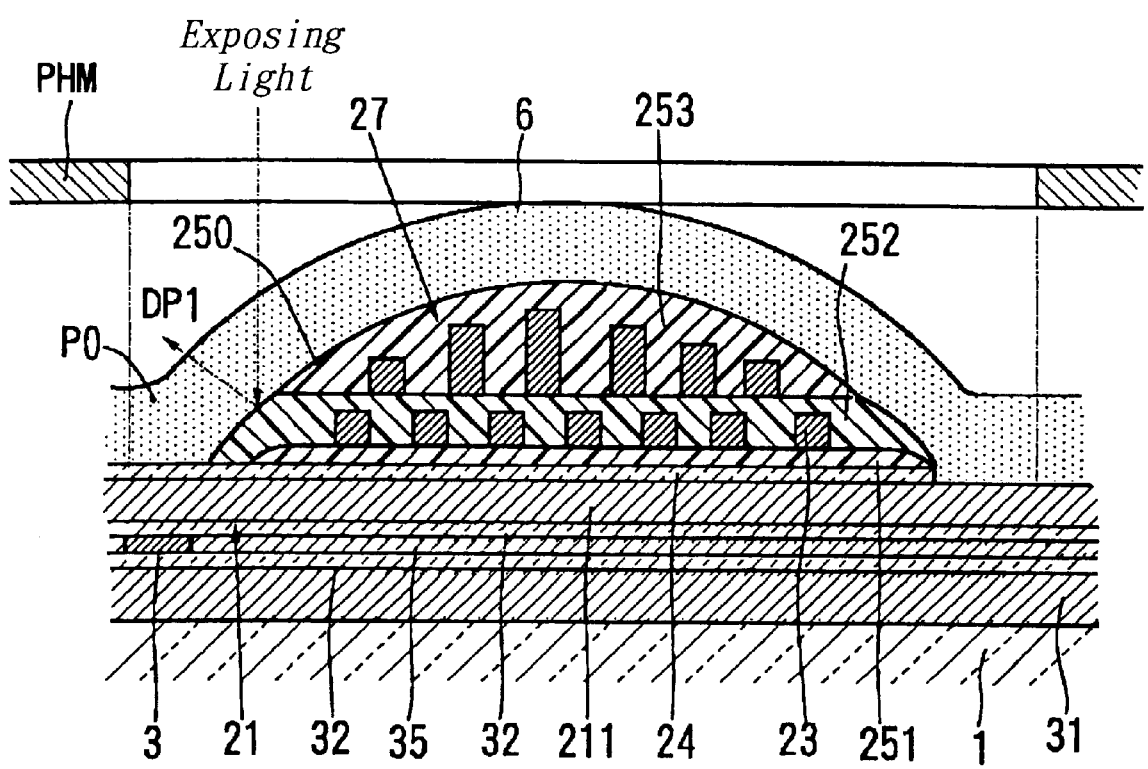
FIG. 7 is a cross sectional view showing the step after the step shown in FIG. 5.

Moreover, as shown in FIG. 7, in the photolithography process for the second magnetic film 22, the reflected exposing light DPI for the pole portion at the inclined portion 250 of the insulating film 253 can be extremely reduced during the exposure for the photoresist 6 via a photomask PHM. As a result, the exposed pattern P0 of the photoresist 6 to define the second pole portion 220 of the second magnetic film 22 can be almost determined by the exposing pattern of the photomask PHM, and then, can be formed precisely.

Figure 8:
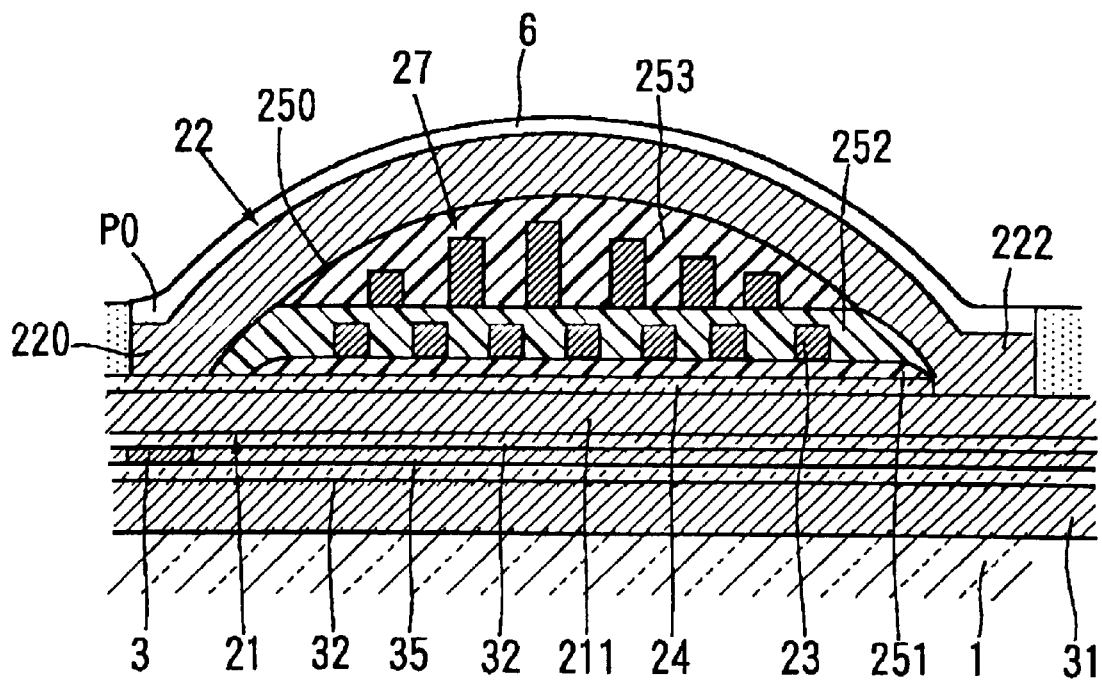
FIG. 8 is a cross sectional view showing the step after the step shown in FIG. 7.

According to the present invention, as shown in FIG. 8, the second pole portion 220 can be formed in a precise pattern. Moreover, the thin film magnetic head having a narrowed track width can be obtained because of the precise pattern of the resistframe 6.

Furthermore, the above thin film magnetic head assembly does not require an antireflection film. Therefore, the degradation of the pattern precision and height of the resistframe 6 due to the difference in the etching rates between the second yoke portion area and the second portion area enclosed by the resistframe can be excluded. As a result, the second pole portion 220 and the second yoke portion 221 can be formed in a precise pattern.

In addition, since the thin film coil 27 has the coil winding body portions with large thickness at the middle between the second pole portion 220 and the second yoke portion 221 as well as the coil winding body portion 271 with small thickness H1 nearest the ABSs 13 and 14, it can a relatively small electric resistance entirely.

Although the pole portion composed of the first magnetic film 21, the gap film 24 and the second magnetic film 22 can have various structures and configurations for attaining a high density recording, for example, the manufacturing method of the present invention can be widely applied for the various structures and configurations.

In the above example, the composite type thin film magnetic head having the writing inductive type magnetic conversion element 2 and the reading MR element 3 is manufactured, and thus, the manufacturing process has to include the step of forming the MR element 3. In the present invention, the MR element 3 may be formed by a normal means before the inductive type magnetic conversion element 2 is formed.

This invention has been described in detail with reference to the above preferred example, but it is obvious for the ordinary person skilled in the art that various modifications can be made in its configuration and detail without departing from the scope of this invention.

As mentioned above, this invention can provide the following effects:

(a) A thin film magnetic head having a magnetic film with a precise pattern on an insulating film and a method for manufacturing the same can be provided.

(b) A thin film magnetic head having a pole portion with a precise pattern composed of a magnetic film on an insulating film and a method for manufacturing the same can be provided.

(c) A thin film magnetic head having a narrowed recording track width and a method for manufacturing the same can be provided.

(d) A thin film magnetic head which can exhibit the above effects without the increase of the electric resistance of a thin film coil and a method for manufacturing the same can be provided.

What is claimed is:

1. A thin film magnetic head comprising a slider having an air bearing surface opposing to a magnetic recording medium and an inductive type thin film magnetic head element, provided on the end face of the slider in air outflow side, including a first magnetic film, a second magnetic film, a gap film, and thin film coils, the first magnetic film having a first pole portion of which forefront is exposed to the air bearing surface and a first yoke portion which extends backward from the air bearing surface, the second magnetic film having a second pole portion which is opposed to the first pole portion of the first magnetic film and of which forefront is exposed to the air bearing surface and a second yoke portion which extends backward from the air bearing surface and magnetically joined with the first yoke portion of the first magnetic film at a back gap portion, the gap film being provided at least between the first pole portion of the first magnetic film and the second pole portion of the second magnetic film, the thin film coils winding around the back gap portion so as to pass through the magnetic circuit enclosed by the first and second magnetic films and being supported by insulating films, wherein the insulating films to support the thin film coils is provided in between the first and the second yoke portions, and the top thin film coil of the thin film coils has a coil winding body portion with a smaller thickness nearest the air bearing surface than that of a coil winding body portion at the middle between the first and second pole portions and the back gap portion.

2. A thin film magnetic head as defined in claim 1, wherein the top thin film coil has a middle coil winding body portion with maximum thickness and forward and backward coil winding body portions with gradually declined thickness forward and backward from the middle coil winding body portion.

3. A thin film magnetic head as defined in claim 1, wherein the coil winding body portion with smaller thickness have a smaller lateral cross section area than the coil winding body portion with larger thickness.

4. A thin film magnetic head as defined in claim 1, wherein the insulating films to support the thin film coils has an inclination angle β of 20 degrees or below on the first pole portion.

5. A thin film magnetic head as defined in claim 1, wherein the thin film coils has a first layer thin film coil and a second layer thin film coil as the top thin film coil, the first layer thin film coil being formed on the first magnetic film via a first insulating film, the second layer thin film coil being formed on a flat surface of a second insulating film to support the first layer thin film coil and being supported by a third insulating film which curves corresponding to the thickness variation of the coil winding body portions.

6. A thin film magnetic head as defined in claim 1, further comprising a magnetoresistive effective element for reading besides the inductive type thin film magnetic head element for writing.

7. A thin film magnetic head as defined in claim 6, wherein the magnetoresistive effective element includes a spin valve film structure.

8. A thin film magnetic head as defined in claim 7, wherein the magnetoresistive effective element is provided in between a first shielding film and a second shielding film, and the first magnetic film and the second shielding film are composed of the same magnetic film.

\* \* \* \* \*